United States Patent [19]

Puchas

[11] 3,810,651
[45] May 14, 1974

[54] SUSPENSION FOR THE REAR WHEELS OF A MOTOR VEHICLE

[75] Inventor: Christian Puchas, Fellbach, Germany

[73] Assignee: Daimler-Benz Aktiengesellschaft, Stuttgart-Unterturkheim, Germany

[22] Filed: June 28, 1972

[21] Appl. No.: 267,116

[30] Foreign Application Priority Data
June 28, 1971 Germany............................ 2132087

[52] U.S. Cl. .......................... 280/124 A, 267/20 A
[51] Int. Cl. ............................................. B60g 11/56
[58] Field of Search ................... 280/124 R, 124 A; 267/15 R, 15 A, 20 R, 20 A; 188/18 A

[56] References Cited
UNITED STATES PATENTS

| 3,709,516 | 1/1973 | Ewert ............................. 280/124 R |
| 3,469,649 | 9/1969 | Hoyt et al. ......................... 280/124 |
| 3,075,600 | 1/1963 | Ordorica et al. ................ 280/124 A |
| 3,446,513 | 5/1969 | Weiertz............................ 188/18 A |
| 3,202,237 | 8/1965 | Dreisziger ...................... 280/124 A |
| 3,177,965 | 4/1965 | Dews .............................. 280/124 A |
| 3,469,859 | 9/1969 | Giacosa........................... 280/124 R |

Primary Examiner—Philip Goodman
Assistant Examiner—John A. Carroll
Attorney, Agent, or Firm—Craig & Antonelli

[57] ABSTRACT

A suspension for the rear wheels of a vehicle, especially a passenger motor vehicle, in which each wheel is supported in a wheel carrier which, in turn, is supported in the horizontal direction by means of a longitudinal strut extending at an inclination to the vehicle longitudinal axis and by means of a transversely disposed tie-rod and in the vertical direction by means of a full load-bearing spring leg consisting of a spring and a shock absorber which is secured at the wheel carrier.

17 Claims, 3 Drawing Figures

SUSPENSION FOR THE REAR WHEELS OF A MOTOR VEHICLE

The present invention relates to a suspension for the rear wheels of a vehicle, especially of a passenger motor vehicle, which are supported in a wheel carrier that is supported in the horizontal direction by means of a longitudinal rod or strut directed obliquely to the vehicle longitudinal axis and by means of a transversely disposed tie-rod and in the vertical direction by means of a spring and a shock absorber.

In a known suspension of the aforementioned type, a practically vertically arranged shock absorber is provided which is mounted at the wheel carrier at a relatively large distance from the wheel center. The coil spring possesses also a vertical axis and is supported, as viewed in the driving direction, on the longitudinal strut in front of the wheel carrier. The longitudinal strut pivotally connected at the wheel carrier has to receive a relatively strong inclination with respect to the vehicle longitudinal direction for the mounting of the spring so that its point of pivotal connection at the frame or chassis frame of the vehicle is disposed far toward the vehicle center.

The present invention is concerned with the task to provide a suspension of the aforementioned type which is characterized by favorable installation dimensions so that the mounting or attachment of additional bearers at the frame or chassis frame of the vehicle can be dispensed with, and at the same time the space within the area of the suspension of the rear wheels can be utilized for the installation of other aggregates, especially of a tank or parts of the exhaust system. The present invention essentially resides in that the spring and the shock absorber are constructed as a fully load-bearing spring leg, which is secured at the wheel carrier. A considerable saving in space is made possible thereby whereas, on the other hand, the longitudinal struts are no longer stressed by the spring. As a result thereof, the bearing supports are not prestressed with a spring force so that fewer noises occur.

In an advantageous embodiment of the present invention, provision is made that the longitudinal struts arranged with slight inclination to the vehicle longitudinal axis are pivotally connected underneath the wheel axle. Particularly owing to the slight inclination, it becomes possible to support the longitudinal strut directly at the longitudinal bearers of the framework extending on both sides of the vehicle.

In order to obtain a favorable camber behavior during inward spring deflections, i.e., a negative camber increase during inward spring deflections, it is appropriate if the shock absorber is inclined slightly toward the vehicle center.

It is provided in an advantageous embodiment of the present invention that the point of pivotal connection of the longitudinal strut at the vehicle frame is located higher than its point of pivotal connection at the wheel carrier. A starting equalization is produced thereby by means of which it is prevented that the vehicle sinks down at the rear end during the starting, i.e., during an acceleration.

In a further advantageous embodiment of the present invention, provision is made that the longitudinal struts of both sides are constructed as parts of a torsion-rod-stabilizer.

In a particularly advantageous construction of the present invention, each rear wheel is equipped in a manner known as such with a disk brake whose brake saddle is rotatably supported on the wheel carrier and is supported at the longitudinal strut. With the aid of this construction, a brake stator is created which also in case of strong braking prevents that the vehicle lifts at the rear end. In one embodiment of the present invention, the support of the brake saddle arranged in front of the wheel axle on the longitudinal strut takes place behind its point of pivotal connection at the wheel carrier. During braking, the thus-supported brake saddle stresses the longitudinal strut in such a manner that it seeks to pull the vehicle down toward the rear or at least keeps the vehicle approximately at the normal height.

Accordingly, it is an object of the present invention to provide a suspension for the rear wheels of a vehicle which avoids the aforementioned shortcomings and drawbacks encountered in the prior art.

Another object of the present invention resides in a suspension for the rear wheels of a motor vehicle which results in space saving, thus permitting the accommodation of other aggregates within the area previously required for the suspension.

A further object of the present invention resides in a suspension for the rear wheels of passenger motor vehicles which excels by favorable installation dimensions and minimizes the parts necessary for the suspension.

Still another object of the present invention resides in a suspension for the rear wheels of motor vehicles in which noises are minimized by eliminating prestress in the bearing supports of parts of the suspension.

Another object of the present invention resides in a rear wheel suspension for motor vehicles which is characterized by favorable camber characteristics coupled with a favorable drive equalization both during accelerations and decelerations of the vehicle.

Still a further object of the present invention resides in a rear wheel suspension of the type described above which achieves the aforementioned aims and objects by simple means yet permits also a particularly favorable disk brake installation.

These and other objects, features, and advantages of the present invention will become more apparent from the following description when taken in connection with the accompanying drawing which shows, for purposes of illustration only one embodiment in accordance with the present invention, and wherein.

Figure 1:
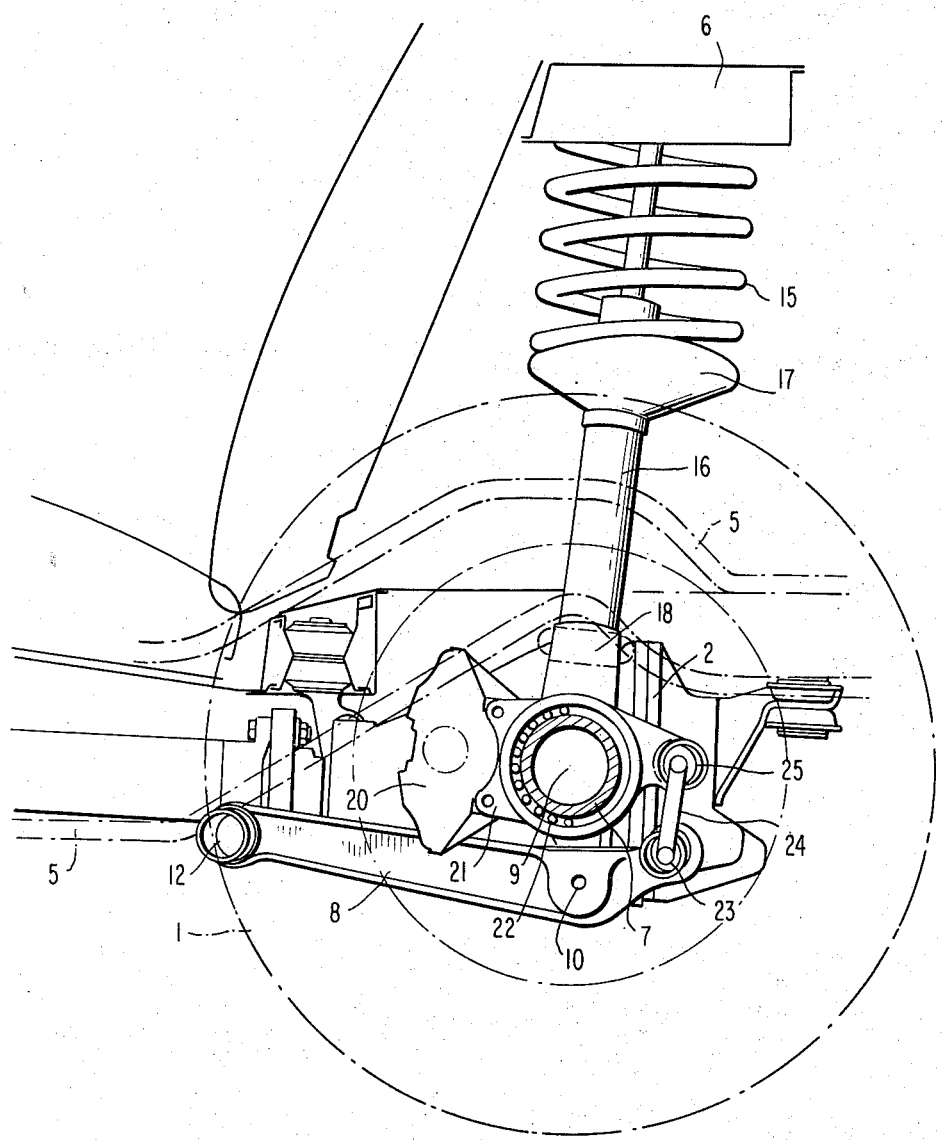
FIG. 1 is a side view, partially in cross section, of a suspension of a rear wheel in accordance with the present invention.
Figure 2:
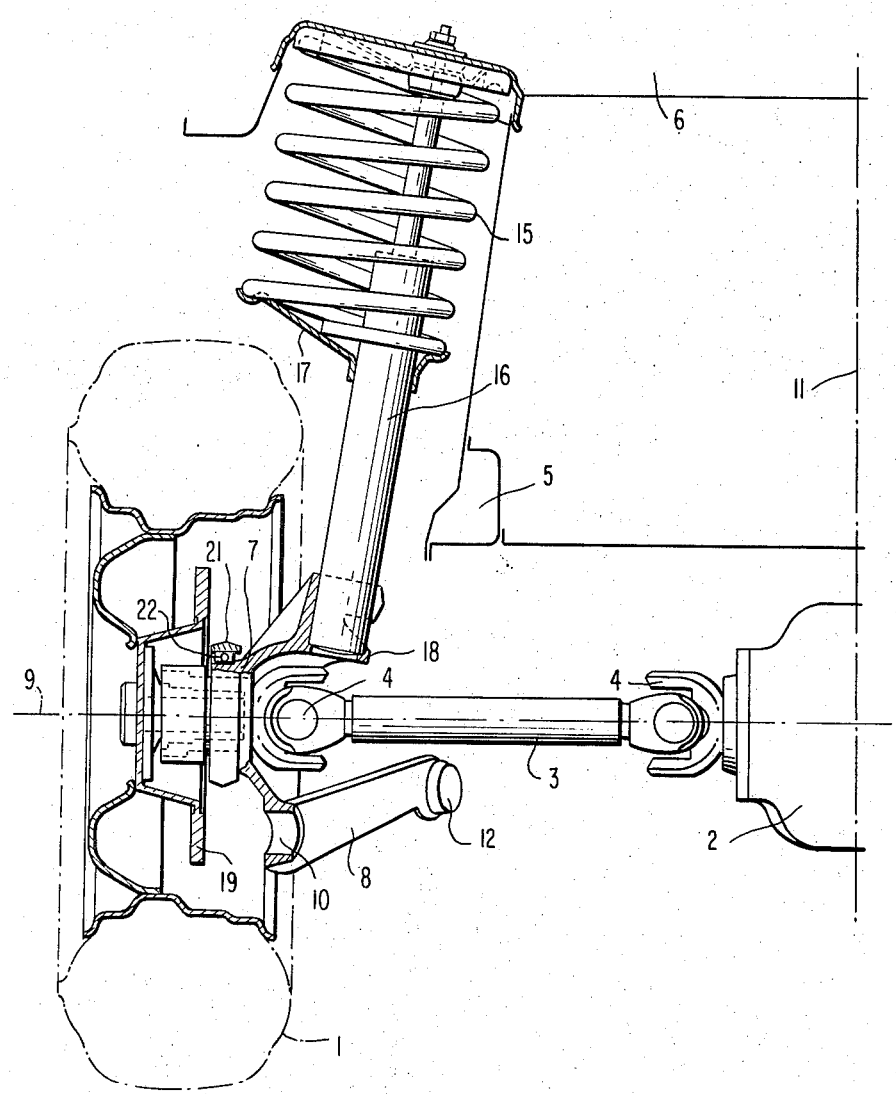
FIG. 2 is a rear elevational view of the suspension of FIG. 1.
Figure 3:
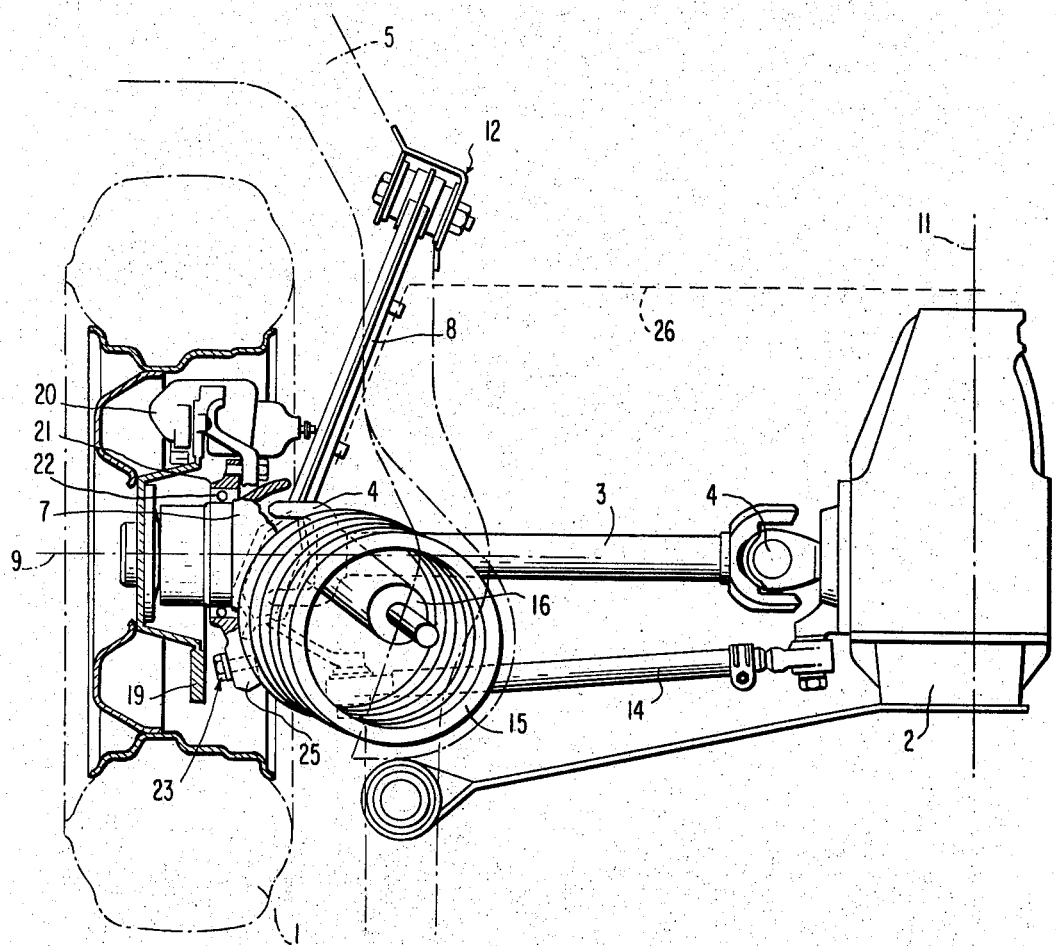
FIG. 3 is a top plan view of the suspension according to FIGS. 1 and 2.

Referring now to the drawing wherein like reference numerals are used throughout the three views to designate like parts, the suspension of the left rear wheel 1 of a passenger motor vehicle is illustrated in the drawing. The suspension of the right rear wheel (not shown) takes place with the use of identical, mirror-symmetrically arranged structural parts. The rear wheel 1 is driven by way of a differential 2 from a respective half-axle 3 which is equipped with two universal joints 4. In lieu of the universal joints, also homokinetic joints may be provided; however, a support rod has to be provided additionally in that case. The rear wheel 1 is supported at the support structure of the vehicle which is normally constituted by frame members of a frame or by parts of a self-supporting body construction forming support bearers. Hence, the term "support structure" will be used hereinafter and in the claims to designate such parts. Of this support structure, a lower longitudinal bearer 5 extending essentially in the wheel plane is illustrated which within the area of the rear wheel 1 is cranked or offset in the upward direction and toward the vehicle center (FIGS. 1 and 3). Additionally, a higher transversely extending bearer 6 of the support structure can be seen in FIGS. 1 and 2.

The rear wheel 1 is journalled on a wheel carrier 7 which is supported in the horizontal and in the vertical direction at the bearers 5 and 6. A longitudinal strut 8 is provided for the horizontal support which is connected with the wheel carrier 7 in a joint 10 underneath the wheel axle 9. The longitudinal strut 8 extends with a slight inclination relative to the vehicle longitudinal center plane 11 (FIGS. 2 and 3) and is pivotally connected directly at the longitudinal bearer 5 in a bearing support 12 having an obliquely disposed axis. The wheel carrier 7 is therebeyond supported in the horizontal direction by means of a transversely disposed tie-rod 14 which is pivotally connected with the wheel carrier 7 and the differential 2.

In the vertical direction, the wheel carrier 7 is supported at the cross bearer 6 by means of a coil spring 15 and a shock absorber 16. The coil spring 15 and the shock absorber 16 are constructed as a fully load-bearing spring leg in that a spring dish 17 is provided at or attached to the lower part of the shock absorber 16 for the coil spring 15 which is supported at the top directly at the cross bearer 6. The lower part of the shock absorber 16 is inserted into an apertured mounting means 18 of the wheel carrier 7 and is retained by means of a clamping connection. This mounting means 18 is disposed approximately vertically above the wheel axle 9.

The axes of the coil springs 15 and of the shock absorber 16 are inclined toward the vehicle center so that an advantageous camber behavior is achieved during inward spring deflections whereby the magnitude of the inclination is determined by the desired location of the instantaneous center.

As can be seen particularly from FIG. 1, the bearing support 10, by means of which the longitudinal strut 8 is pivotally connected at the wheel carrier 7, is located lower than the bearing support 12, by means of which the longitudinal strut 8 is pivotally connected at the longitudinal bearer 5. Since the location of the spring leg is determined essentially from structural considerations, the starting equalization is achieved primarily in that the reaction forces occurring during the starting or acceleration are introduced into the suspension of the rear wheel 1 in such a manner that the vehicle does not sink down at the rear. A starting equalization is made possible thereby which assures that the vehicle does not leave the neutral position or only slightly leaves the neutral position during the starting.

A disk brake is provided for the rear wheel 1 which consists of a brake disk 19 rotating together with the rear wheel 1 and of a brake saddle 20. The brake saddle 20 which is arranged in front of the wheel axle 9 (FIG. 1) is secured at a bearing support part 21 which is supported on the wheel carrier 7 by means of a roller bearing 22. The bearing support part 21 and therewith the brake saddle are supported at the longitudinal strut 8. The longitudinal strut 8 is extended for that purpose rearwardly beyond the bearing support 10 and is provided with a further pivotal connecting point or bearing support 23. A connecting member 24 is secured in this bearing support 23 whose other end is secured in a similar bearing support 25 of the bearing support part 21 which is disposed approximately vertically above the bearing support 23. A brake stator is created by this construction which introduces the reaction force occurring during the braking by way of the bearing support part 21 and the connecting part 24 into the suspension in such a manner that an increase of the brake equalization is created whence it is prevented that the vehicle lifts at the rear end during the braking.

In deviation from the illustrated embodiment, it is possible to arrange the brake saddle 20 to the rear of the wheel axle 9 and to connect the same with the longitudinal strut 8 in front of the wheel axle 9. Additionally, the brake saddle 20 and the connecting parts to the longitudinal strut 8 may also be located on the same side of the wheel axle 9. Therebeyond, it is possible to relocate the rear point of pivotal connection of the longitudinal strut 8 at the wheel carrier within or near the axis of the wheel axle 9 so that the brake saddle 20, which is then also rotatable about the wheel axle 9, can be secured directly at the longitudinal struts 8. It is also possible to construct the longitudinal struts 8 and the torsion-rod-stabilizer 26 in one piece or as an installation part in a manner not illustrated further.

While I have shown and described in detail only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A suspension for the rear wheels of a vehicle having a support structure, wheel carrier means including wheel axles upon which are journalled the rear wheels, and means for indepently suspending each of the rear wheels, said last mentioned means comprising: means for supporting the wheel carrier means with respect to the support structure in the horizontal direction including a longitudinal strut means extending at an inclination to the vehicle longitudinal axis and a substantially transversely disposed tie rod means pivotally connected to the wheel carrier means and a differential of the vehicle, means for supporting the wheel carrier means in the vertical direction including spring and shock absorber means constructed as a full load-bearing spring leg means, means for pivotally connecting one end of said longitudinal strut means at the wheel carrier means at a height substantially corresponding to the height of the wheel axle, and means for pivotally connecting the other end of said longitudinal strut means at the support structure at a point above the point of pivotal connection at the wheel carrier means.

2. A suspension according to claim 1, wherein said longitudinal strut means are pivotally connected at the wheel carrier means below the wheel axle.

3. A suspension according to claim 1, wherein said longitudinal strut means are pivotally connected at the wheel carrier means in points disposed at least approximately in the center of the respective wheel axle.

4. A suspension according to claim 1, wherein the shock absorber means is inclined slightly toward the vehicle center.

5. A wheel suspension according to claim 1, wherein said longitudinal strut means on both sides are constructed as parts of a torsion-rod-stabilizer.

6. A suspension according to claim 1, further comprising a disk brake means provided at each rear wheel including a brake saddle means rotatably supported with respect to the wheel center and means for supporting said brake saddle means at said longitudinal strut means.

7. A suspension according to claim 6, wherein the spring leg means includes a spring dish mounted on the shock absorber means in a generally upright transverse plane containing the wheel axis.

8. A suspension according to claim 7, wherein said generally upright transverse plane is slightly inclined toward the rear as viewed in side view of the vehicle with respect to a vertical plane.

9. A suspension according to claim 1, wherein the axis of the shock absorber means is inclined upwardly toward the vehicle center as viewed in end view of the vehicle.

10. A suspension according to claim 9, wherein the wheel carrier means includes mounting means for mounting thereon the brake saddle means of a disk brake.

11. A suspension according to claim 10, wherein said longitudinal strut means is provided with an extension and said mounting means includes an extension connected to said extension of said longitudinal strut means.

12. A suspension according to claim 11, wherein the connection between the brake saddle means and the mounting means and between the mounting means and the longitudinal strut means are located on opposite sides relative to the wheel axis.

13. A suspension according to claim 11, wherein the point of pivotal connection of the longitudinal strut means at the wheel carrier means substantially coincides with the wheel axis.

14. A suspension according to claim 13, wherein said brake saddle means is rotatably secured directly at the longitudinal strut means rotatable about the wheel axis.

15. A suspension according to claim 9, wherein the spring leg means includes a spring dish mounted on the shock absorber means in a generally upright transverse plane containing the wheel axis.

16. A suspension according to claim 15, wherein said generally upright transverse plane is slightly inclined toward the rear as viewed in side view of the vehicle with respect to a vertical plane.

17. A suspension according to claim 16, wherein the axis of the shock absorber means is inclined upwardly toward the vehicle center as viewed in end view of the vehicle.

* * * * *